US007111783B2

(12) United States Patent
Xi et al.

(10) Patent No.: US 7,111,783 B2
(45) Date of Patent: Sep. 26, 2006

(54) AUTOMATED DIMENSIONAL INSPECTION

(75) Inventors: Ning Xi, Okemos, MI (US); Chen Heping, East Lansing, MI (US); Quan Shi, East Lansing, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 172 days.

(21) Appl. No.: 10/877,083

(22) Filed: Jun. 25, 2004

(65) Prior Publication Data

US 2005/0284937 A1 Dec. 29, 2005

(51) Int. Cl.
*G06K 5/00* (2006.01)
(52) U.S. Cl. .................................................. 235/437
(58) Field of Classification Search ............... 235/437; 364/512; 700/184; 348/43; 356/614
See application file for complete search history.

(56) References Cited

U.S. PATENT DOCUMENTS

| 4,901,253 | A | * | 2/1990 | Iwano et al. ................ 345/419 |
|---|---|---|---|---|
| 4,974,165 | A | * | 11/1990 | Locke et al. ................ 700/193 |
| 5,311,784 | A | | 5/1994 | Girard et al. |
| 5,465,221 | A | | 11/1995 | Merat et al. |
| 5,477,446 | A | | 12/1995 | Takakura et al. |
| 6,023,680 | A | | 2/2000 | Wooster et al. |
| 6,292,715 | B1 | | 9/2001 | Rongo |
| 6,597,967 | B1 | * | 7/2003 | Xi et al. ...................... 700/184 |
| 6,636,818 | B1 | | 10/2003 | Lawrence |
| 2002/0018118 | A1 | * | 2/2002 | Coulombe et al. ............ 348/43 |
| 2004/0174541 | A1 | * | 9/2004 | Freifeld ....................... 356/614 |

OTHER PUBLICATIONS

F. Chen, G.M. Brown, M. Song, Overview of Three Dimensional Shape Measurement Using Optical Methods, Optical Engineering 39(1): 10-22, Jan. 2000.
C.C. Yang, M.M. Marefat, F.W. Ciarallo, "Error Analysis and Planning Accuracy for Dimensional Measurement in active Vision Inspection", IEEE Transactions on Robotics and Automation, vol. 14, No. 3 Jun. 1998.
H.D. Park, O.R. Mitchell, "Cad Based Planning and Execution of Inspection", In Proceedings of the 1988 Computer Society Conference on Computer Vision and Pattern Recognition, pp. 858-863, 1988.
M. Marefat, R.L. Kashyap, "Automatic Construction of Process Plans from Solid Model Representations", IEEE Transactions on Systems, man, cybernetics, 22:1097-1115.

(Continued)

*Primary Examiner*—Thien M. Le
*Assistant Examiner*—Kristy A. Haupt
(74) *Attorney, Agent, or Firm*—Harness, Dickey & Pierce, P.L.C.

(57) ABSTRACT

An automated dimensional inspection system is provided that modifies sensor planning based on real-time measurement feedback. The dimensional inspection system includes a sensor planner, an error map generator, and a sensor affixed to a movable member. The sensor planner is adapted to receive three dimensional design data for a workpiece to be measured and generate path data in part based on the dimensional design data for the workpiece, where the path data is indicative of a path for moving the sensor in relation to the surface of the workpiece. The error map generator is adapted to receive the dimensional design data and the three dimensional measurement data for the workpiece, and determine error data between the measurement data and the dimensional design data. Based on the error data, the sensor planner is able to further modify the path data for the sensor to increase the measurement accuracy.

32 Claims, 7 Drawing Sheets

OTHER PUBLICATIONS

C.K. Cowan and P.D. Kovesi, "Automatic Sensor Placement from Vision Task Requirements," IEEE transaction on pattern analysis and machine intellegence 10(3): 407-416, 1988.

W. Sheng, N. Xi, M. Song, Y. Chen, J.S. Rankin III, "Automated CAD-Guided Automobile Part Dimensional Inspection," International Conference on Robotics and Automation, 2000, San Francisco.

* cited by examiner

AUTOMATED DIMENSIONAL INSPECTION

FIELD OF THE INVENTION

The present invention relates to automated dimensional inspection and, more particularly, to a dimensional inspection system that modifies sensor planning based on real-time measurement feedback.

BACKGROUND OF THE INVENTION

Current automotive manufacturing inspection process needs an automated dimensional measurement to speed up the entire process. There are two aspects about the automated dimensional inspection system: first, instead of measuring object surface point-by-point using a probe, people have been expecting to get surface dimensions patch-by-patch using a non-contact area sensor; second, to measure a large part, such as a car door, the sensor needs to be located at multiple sensing points without human guidance. The first aspect relates to the research area of three-dimensional surface optical measurement and the second aspect relates to the research area of sensor planning. Both of them have a quantity of researchers involved but few methods consider integrating both of them together to make an automated dimensional inspection system. Therefore, an integrated system which automatically measures dimensions of large size three dimensional objects is needed to satisfy industry requirements.

SUMMARY OF THE INVENTION

In accordance with the first aspect of the present invention, an automated dimensional inspection system is provided that modifies sensor planning based on real-time measurement feedback. The dimensional inspection system includes a sensor planner, an error map generator, and a sensor affixed to a movable member. The sensor planner is adapted to receive three dimensional design data for a workpiece to be measured and generate path data in part based on the dimensional design data for the workpiece, where the path data is indicative of a path for moving the sensor in relation to the surface of the workpiece. The error map generator is adapted to receive the dimensional design data and the three dimensional measurement data for the workpiece, and determine error data between the measurement data and the dimensional design data. Based on the error data, the sensor planner is able to further modify the path data for the sensor.

In accordance with another aspect of the present invention, a method is provided for determining height information of a workpiece using a non-contact sensor. The method includes: projecting a pattern of light having repeatable features onto a surface of the workpiece; correlating the repeatable features of the light pattern to a measure at which image data for the surface of the workpiece is captured; and determining a height measure for a given measurement point on the surface of the workpiece based in part on location of the measurement point in relation to the light pattern.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
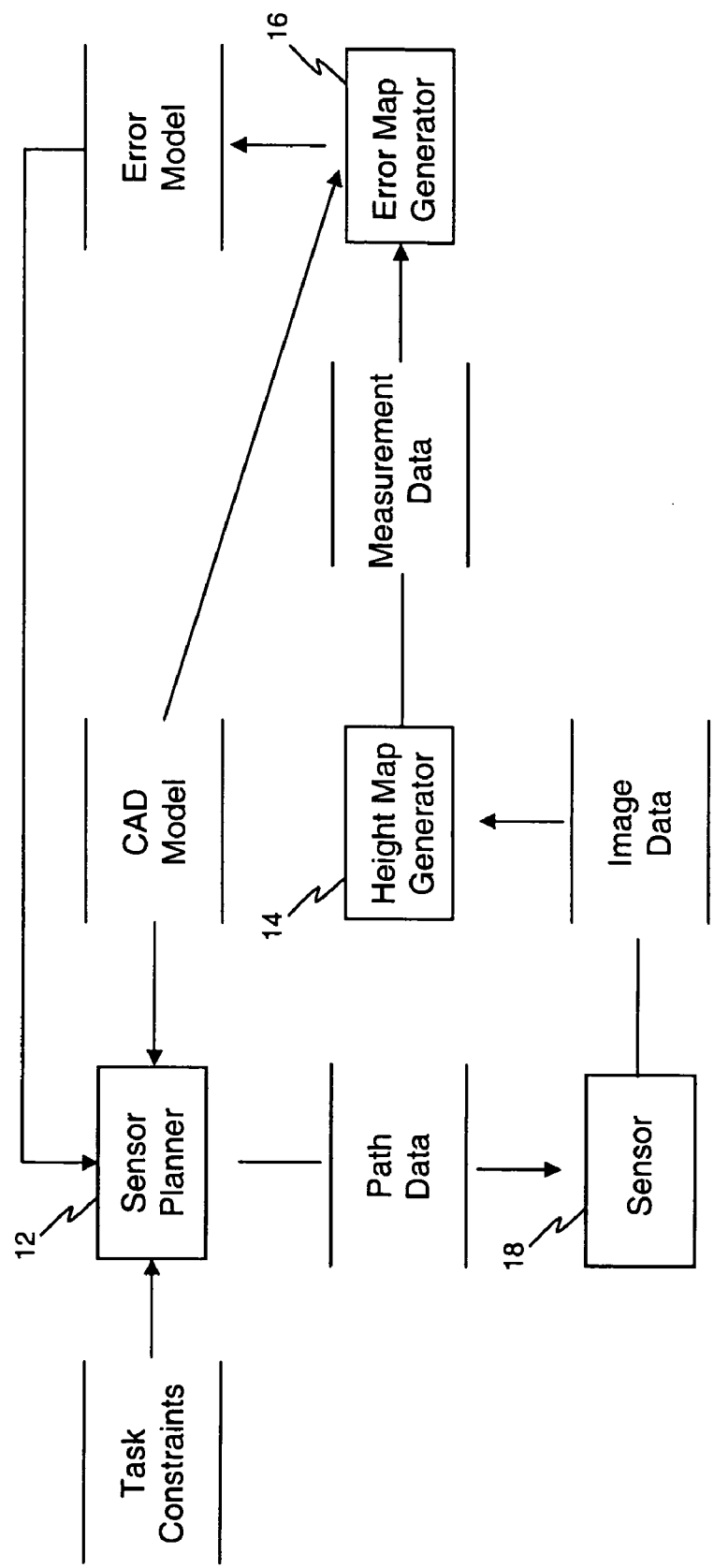
FIG. 1 is a block diagram of an intelligent dimensional inspection system in accordance with the present invention.

FIG. 1 illustrates an intelligent dimensional inspection system in accordance with the present invention. The dimensional inspection system 10 generally includes an intelligent sensor planner 12, a height map generator 14, an error map generator 16, and a sensor 18 affixed to a movable member, such as a robot. In operation, the sensor planner 12 is adapted to receive three-dimensional design data for a workpiece or another type of object which is to be measured. In an exemplary embodiment, the dimensional design data is in the form of CAD model for the workpiece. The sensor planner 12 then generates path data for the sensor 18 based on the three-dimensional design data.

Briefly, sensor planning is comprised of three principle components: sensor configuration planning, robot path generation and robot implementation. In sensor configuration planning, a number of sensor configurations are generated for inspecting the surface of the workpiece. A robot path generator in turn calculates an optimal path for touring all of the sensor configurations. Lastly, a robot controller is responsible for coordinating movement of the robot along the determined path. By traversing the sensor along the generated path, the inspection system is able to capture image data for the entire surface of the workpiece.

In order to ensure measurement accuracy, the sensor planner 12 takes into account various constraints when determining the sensor path. Four exemplary constraints satisfied by the sensor planner of the present invention include: visibility, field of view, resolution, focus and the direction of the light pattern. The visibility constraint demands that there is no occlusion along the image plane between the imaging device and the inspected object. The field of view constraint dictates the size of the maximum inspection area. The resolution constraint defines the minimal dimension to be pictured on one camera pixel. The focus constraint gives the in-focus region for the imaging device. The direction constraint defines the pattern direction related to a part. However, it is readily understood that other types of constraints fall within the broader aspects of the present invention.

A variety of known techniques may be used to generate the needed sensor configurations. In an exemplary embodiment, a recursive bounding box approach may be used to generate sensor configurations. Briefly, a bounding box is created by projecting all the vertices of an inspected surface along three orthonormal directions. If a solution satisfies the constraints for the measuring the surface patch, then a viewpoint is configured to this surface patch. If no solution exists, then the inspected surface patch is split into smaller patches, such that each sub-patch is tested in a similar manner. This searching process is iteratively repeated until a solution is reported. Further details regarding this exemplary technique may be found in U.S. patent application Ser. No. 09/795,573 filed on Feb. 28, 2001; disclosure of this application is incorporated by reference herein. However, it is readily understood that other techniques for determining sensor configurations are also within the scope of the present invention.

Captured image data then undergoes image data analysis in order to determine dimensional measurement data for the workpiece. In particular, the height map generator 14 receives the captured image data and generates three-dimensional measurement data for the workpiece. To assess the measured workpiece, the three-dimensional measurement data is then compared with the dimensional design data for the workpiece. Specifically, the error map generator 16 generates an error map based on the dimensional design data and the dimensional measurement data received from the height map generator 14. However, the art is currently void of automated techniques for verifying and improving the accuracy of sensor planning methods, thereby improving the overall inspection process. As further described below, the sensor planner 12 is further adapted to receive error data from the error map generator and automatically adjust the path data based on the error data.

Figure 2:
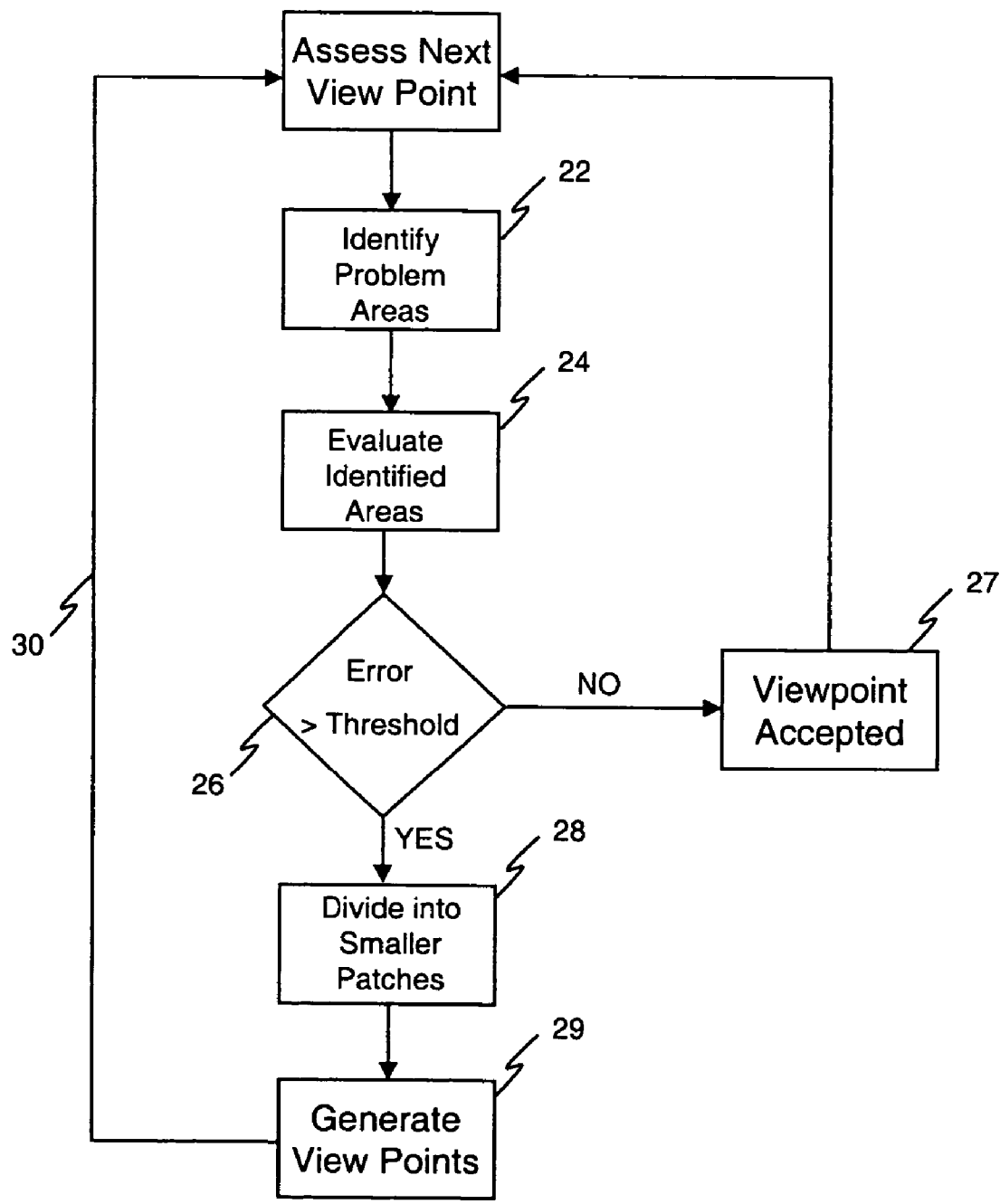
FIG. 2 is flowchart illustrating a method for modifying sensor configurations using real-time measurement feedback in accordance with the present invention.

FIG. 2 illustrates a technique that modifies sensor planning based on real-time measurement feedback. Each viewpoint will be assessed as further described below. Measurement data taken at each view point as well as the corresponding error map for the measurements serve as input to this process.

For each viewpoint, steps are taken at 22 to identify potential problems areas. First, shadow areas can be identified based on the sensor configuration, shadow can be identified. To do so, the CAD model of a part is rendered into triangles. For each triangle, the normal can be found. Suppose the normal of the triangle is $\vec{V}_1$. The direction of the sensor is given for each sensor configuration. Suppose the direction of the sensor is $\vec{V}_2$. The angle between them can be calculated:

$$\theta = a\cos\left(\frac{\vec{V}_1 \cdot \vec{V}_2}{\|\vec{V}_1 \cdot \vec{V}_2\|}\right)$$

If $\theta \geq \theta_{th}$, where $\theta_{th}$ is the threshold angle, we can consider the triangle to have a shadow problem. After all of the triangles in the patch are processed, a list of triangles with a shadow problem are identified, i.e., $T_{s1}=\{T_i, i=1, \ldots, M\}$.

Second, a white pattern may be projected on to the part. From the captured image, the dark areas correspond to shadow areas. In this instance, shadow areas are identified based on the intensity of the pixel data as is known in the art. In this way, a second set of triangles with a shadow problem is identified as $T_{s2}=\{T_i, i=1, \ldots, N\}$.

Third, the triangles having a large measurement error are identified. The errors from the error model and the actual measurement are used to identify the triangles with large error. Based on system given requirements, a maximum error is given. Suppose the maximum error is $e_{max}$. For each data point, which is corresponding to a point on the CAD model, the error is compared with $e_{max}$. For a point on the CAD model, triangles with the point as a vertex can be identified. When $e > e_{max}$, then a third set of triangles having a potential problem are identified as $T_e=\{T_i, i=1, \ldots, P\}$.

Lastly, the triangles from these three sets of triangle are combined to form a set of triangles indicating potential problem areas for a given view point. It is readily understood that each of these technique or some combination thereof may be used to identify potential problem areas. It is further understood that other known techniques for identifying such problem areas also fall within the broader scope of the present invention.

Next, each of the identified problem areas are evaluated at step 24. For the identified triangles, the average normal is first calculated. The angles between the average normal and the normal of each triangle is then calculated. For these angles, a maximum angle is found and then compared to a predetermined threshold angle at step 26. If the maximum angle does not exceed the threshold angle, then the view point is deemed acceptable and processing continues with the next view point as shown at step 27.

Conversely, if the maximum angle is larger than a predetermined threshold angle, then the viewpoint is deemed to be unacceptable. The set of identified triangles are divided into two small patches at step 28. Additional viewpoints are generated at 29 based on the sensor constraints as described above. These additional view points are then use to re-measure the part and feed back into the error model. Next, the additional view points are reassessed as shown at 30. If the errors for some small patches cannot satisfy the error threshold, the process continues until the constraints are satisfied.

To generate an error model, captured image data must undergo image data analysis in order to extract surface dimensional data from the images. A measurement configuration for the dimensional inspection system is diagrammatically shown in FIG. 3. In this configuration, h(x,y) represents the distance from a measured surface point D to the reference plane R. To calculate h(x,y), the distance between two points AC along the reference plane is first calculated, where A corresponds to the given measurement point projected along an image plane of the imaging device onto the reference plane and C corresponds to the given measurement point projected along a projection plane of the light pattern onto a workpiece. The relationship between triangles ACD and DPOc can then be used to compute h(x,y).

$$h(x, y) = \frac{L_{AC}S}{d + L_{AC}} \quad (4)$$

Figure 4:
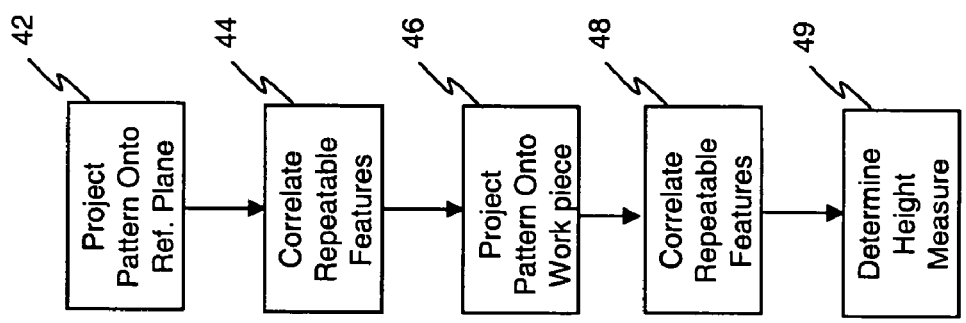
FIG. 4 is a flowchart illustrating an improved method for determining height information for a measured object in accordance with the present invention.

In one aspect of the present invention, an improved method for determining height information is further described in relation to FIG. 4. Patterns of light having repeatable features are projected at step 42 onto a reference surface oriented perpendicular to the light source projecting the light pattern. The repeatable features of the pattern are correlated to a measure at which the image data is captured at step 44 as further described below. This baseline information will be used to analyze image data for the measured object.

Figure 5:
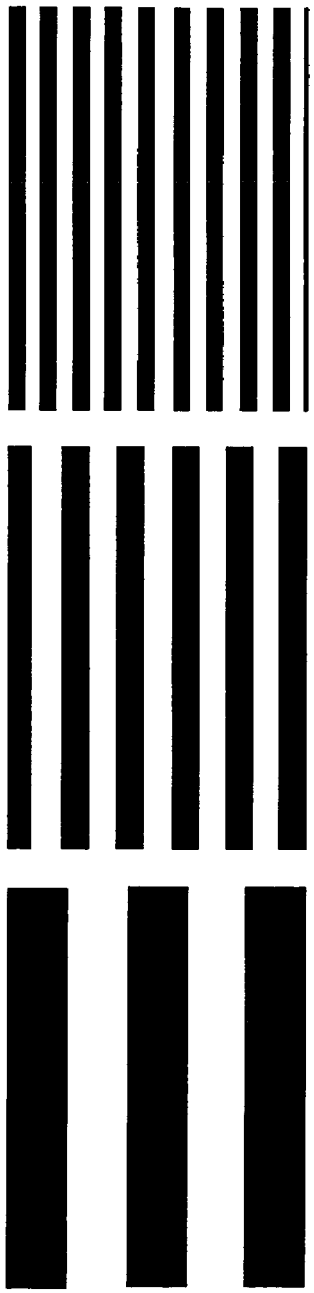
FIG. 5 illustrates three exemplary striped light patterns which may be projected onto the surface of a measured object.

Next, the patterns of light are projected at step 46 onto the surface of the measured object and likewise repeatable features of the pattern are correlated at step 48 to a measure at which the image data was captured. More specifically, multiple light patterns are projected on the surface and image data is captured for each different pattern. In an exemplary embodiment, the light pattern is a plurality of stripes, such that frequency of the stripes is increased and the width of each stripe is decreased as shown in FIG. 5. It is readily understood that the light pattern is refined to meet the required system resolution. Pattern data at each pixel are encoded for each different light pattern and then used to determine a height measure at step 49 as further described below.

Figure 6:
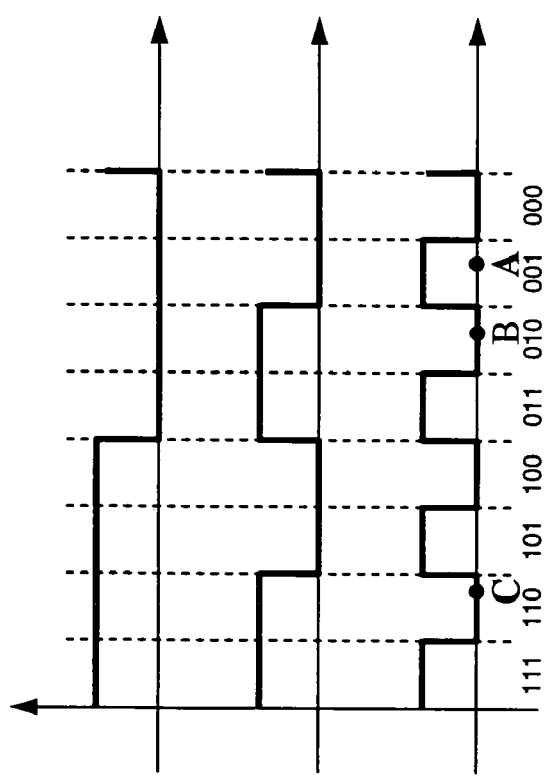
FIG. 6 is a graph depicting how the pattern data projected onto the surface of the measure object is encoded in accordance with the present invention.

FIG. 6 illustrates a simplified example of the encoding process. For illustration purposes, three different patterns are projected onto the surface of the measured object, where each pattern has a decreased stripe width. Pattern data are encoded such that a black stripe is coded 0 and a white stripe is coded 1. In this example, the stripes (from left to right) are encoded as follows: 111, 110, 101, 100, 011, 010, 001 and 000.

Figure 3:
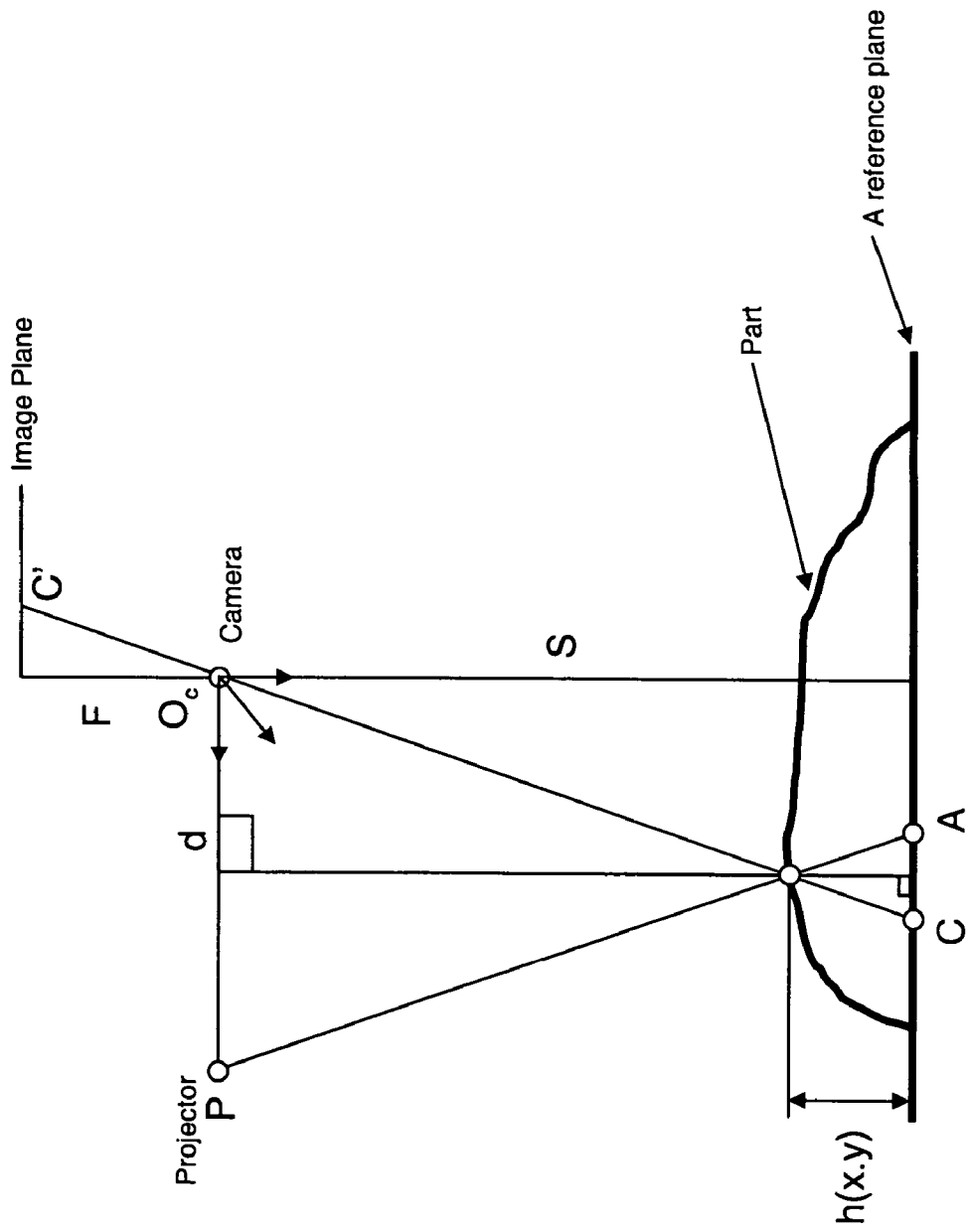
FIG. 3 is a diagram illustrating the measurement configuration of a sensor in relation to the measured object.

With reference to FIGS. 3 and 6, the distance measure for AC may be determined as follows. Along the image plane of the imaging device, points C and D are the same point. In other words, if the coordinates for point D is known, point C can be found in the image data of a part. Then the code of point C is determined. Similarly, points A and D have the same codes, such that of the code of point D is known, the code of point A can be found in the image data on part. Thus, the distance between points A and C is calculated using the difference of the codes between points A and C.

The distance measure for AC may be expressed as AC=AB+BC, where B is a point interposed between point A and C at a location within a given stripe (preferably the stripe adjacent to the stripe contain point A) that corresponds to the location of point C within its stripe. BC is expressed as BC=n×ws, where n is the number of stripes between points B and C and ws is the width of a given stripe in the highest frequency pattern. In other words, BC may be determined by counting the number of stripes between points B and C. On the other hand, AB is expresses AB=m× wp, where m is the number of pixels between points A and B and wp is the width of a given pixel in the imaging device.

A height measure for surface point D is finally computed using the distance measure for AC and the triangle relationship defined above. The above-described calculations are then repeated for each of the surface points captured in the image data, thereby generating a height map for the sensor configuration. While a particular height determining algorithm has been described above, it is readily understood that other height determining algorithms (e.g., known phase wrapping techniques) are also within the broader aspects of the present invention.

Figure 7:
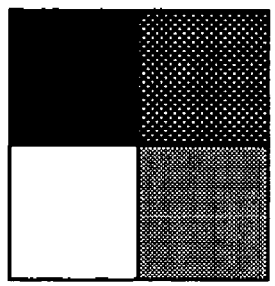
FIG. 7 illustrates three exemplary grid light patterns which may be projected onto the surface of a measured object.
Figure 7:
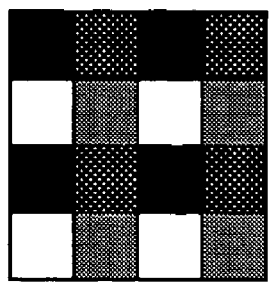
Figure 7:
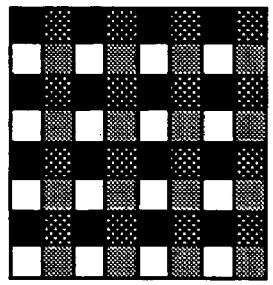

In an alternative embodiment, the sensor includes a light projector and two imaging devices (e.g., CCD cameras) which are oriented perpendicular to each other. The light projector is used to project a grid pattern onto the surface of the measured object as shown in FIG. 7. Four different colors may be used to generate the pattern. For illustration purposes, the pattern is comprised of white, black, red and blue. However, it is readily understood that different colors may be employed. Likewise, the four different patterns may be generate using black and white patterns of varying intensity values (e.g., 0, 85, 170 and 255).

Figure 8:
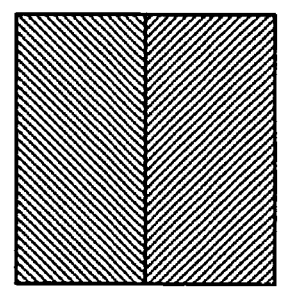
FIG. 8 illustrates how the grid pattern data is merged together along the x direction to form horizontal stripes.
Figure 8:
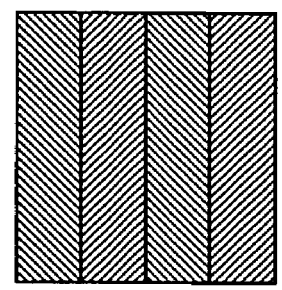
Figure 8:
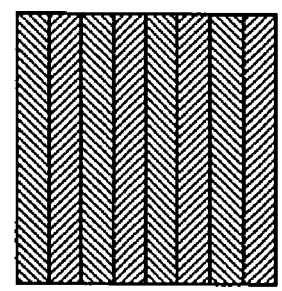

Pattern data is coded along two perpendicular directions X and Y. Along the X direction, red and blue patterns are merged together to form horizontal stripes as shown in FIG. 8. Thus, the stripes along the X direction can be coded. Distance between two points can then be determined in the manner described above. Similarly, black and white patterns can be merged along the Y direction to form vertical stripes. One advantage of this approach is that two sets of height information are obtained at a given time.

Next, the parameters of the sensor system are calibrated with respect to a reference frame. Because the sensor system moves with the end-effector of a robot, the fixed reference plane, which typically is used for dimensional inspection, does not work any more. Therefore, a virtual reference frame is generated to compute the height information. Since this height information is related to the virtual reference frame as shown in FIG. 3, the height information has to be transferred into the part frame in order to compare the measured point cloud with the designed CAD model.

There are two transformations involve in transferring the height information in the image frame to the robot base frame: the transformation $R_{IC}$ from the image frame to the camera frame; the transformation $R_{CB}$ from the camera frame to the robot base frame, which can expressed as:

$$\begin{bmatrix} X_B \\ Y_B \\ Z_B \end{bmatrix} = R_{IC} R_{CB} \begin{bmatrix} X_I \\ Y_I \\ Z_I \end{bmatrix} = R_{IB} \begin{bmatrix} X_I \\ Y_I \\ Z_I \end{bmatrix} \qquad (5)$$

The transformation matrix $R_{IB}$ can be obtained using a system calibration method.

After the coordinate transformation, point cloud data can be obtained. Point cloud representation of the object is ambiguous because the object geometry is only known at a finite number of discrete locations, while the object topology is totally unknown. To recover the object shape, topological and geometric properties of the object need be recovered from the point cloud. A triangle mesh interpolating the sample points is first reconstructed, which captures the object topology with an associated combinatorial structure and linearly approximates the geometric information between the sample points. However, the connectivity imposed by the constructed combinatorial structure does not necessarily capture the actual differential geometry of original surface since noise is added to the system, such as the noise in the measured intensity signals. Filters have to be designed to smooth the point cloud data. A feature filtering algorithm is used to smooth the noise of the point cloud data. Surface fitting to a set of given data is widely used in image processing, pattern recognition, computer vision.

Implicit surface fitting with implicit polynomials avoids the error distance problem. An implicit surface can be expressed as:

$$f(x, y, z) = 0 \text{ where} \quad (6)$$

$$f(x, y, z) = \sum_{0 \leq i,j,k \leq N} a_{ijk} x^i y^j z^k \quad (7)$$

where N is the order of the polynomial; $\alpha_{ijk}$ are coefficients; x, y and z coordinates. Equation (6) can be written as:

$$f(x, y, z) = AX \quad (8)$$

with $$A = [\alpha_{000} \alpha_{100} \alpha_{010} \alpha_{001} \alpha_{200} \alpha_{110} \ldots \alpha_{00N}]$$

$$X = [(1)(x)(y)(z)(x^2)(xy)(yz)(xz)(y^2) \ldots (z^N)]^T$$

Figure 9:
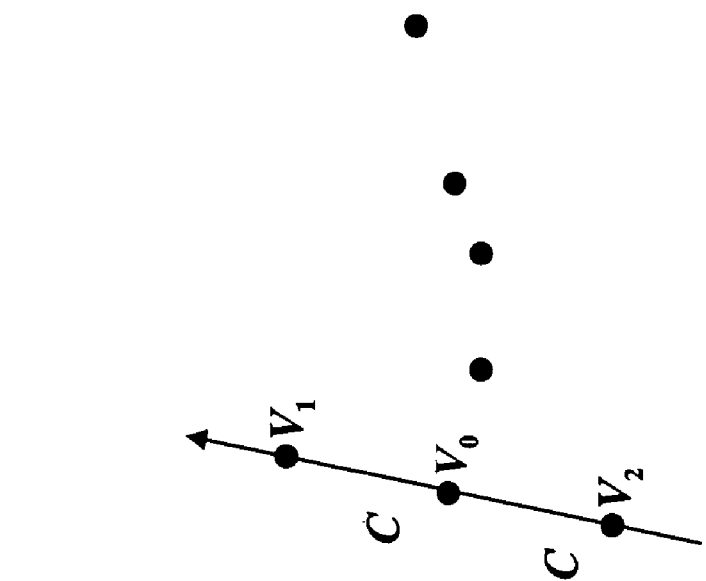
FIG. 9 is a diagram illustrating the vertex projection process of the point cloud data.

It is well-known that fourth order polynomial models can represent many useful three-dimensional surfaces. A 3L algorithm is adopted here to fit a polynomial surface to the original surface data. For instance, a suitable 3L algorithm is described in M. M. Blane and Z. Lei and H. Civi and D. B. Cooper, "The 3L Algorithm for Fitting Implicit Polynomial Curves and Surfaces to Data", IEEE Transaction on Pattern Analysis and Machine Intelligence, March 2000, 22(3), 298–313. For point $V_0$, an average normal can be calculated within a certain area. Then the vertex $V_0$ is projected along the average normal direction to a distance C and −C. FIG. 9 show the vertex projection process. Another two sets of data $X_1$ and $X_2$ can be obtained and satisfy the following equations:

$$AX_1 = C$$

$$AX_2 = -C \quad (9)$$

From equations (8) and (9), we have:

$$A[(X_2)(X)(X_1)] = [(-C)(0)(C)] \quad (10)$$

This equation can be written as:

$$AZ = B \quad (11)$$

The coefficient of the implicit surface can be calculated as:

$$A = B(Z^T)(ZZ^T)^{-1} \quad (12)$$

After the coefficient of the implicit surface is obtained, the original data set will be projected to the implicit surface to obtain a new set of data which smooth the noise of the original point cloud data. After the featuring filtering algorithm is applied, a new set of point cloud data $[X'_B \ Y'_B \ Z'_B]$ can be obtained from the original point cloud data $[X_B \ Y_B \ Z_B]'$.

The CAD model of a part is also transferred to the robot base frame using a calibrated matrix:

$$\begin{bmatrix} X'_D \\ Y'_D \\ Z'_D \end{bmatrix} = T_{PB} \begin{bmatrix} X_D \\ Y_D \\ Z_D \end{bmatrix}$$

The error map is obtained by comparing the measured coordinates with the CAD model:

$$E = \begin{bmatrix} X'_B \\ Y'_B \\ Z'_B \end{bmatrix} - \begin{bmatrix} X'_D \\ Y'_D \\ Z'_D \end{bmatrix} \quad (13)$$

The error model is used to estimate the source of the error in the dimensional inspection. The error model can be used to predict the error of a system. Measurement error may originate from several factors.

First, error caused by the resolution of a camera and calibrated parameters d and S. Using equation (4), the height error is formulated as:

$$H = \frac{(S + \Delta S) * (L_{AC} + \Delta L_{AC})}{(d + \Delta d) + (L_{AC} + \Delta L_{AC})}$$

Then the error due to the phase error and the camera parameters is obtained:

$$\Delta h = H - h$$

$$= \frac{L_{AC} \Delta S}{d + L_{AC} + \Delta d + \Delta L_{AC}} + \frac{S d \Delta L_{AC} - S L_{AC} \Delta d}{(d + L_{AC} + \Delta d + \Delta L_{AC})(d + L_{AC})}$$

If $d \gg \Delta d$ and $L_{AC} \gg \Delta L_{AC}$, $$\Delta h_1 = H - h = \frac{L_{AC} \Delta S}{d + L_{AC}} + \frac{S d \Delta L_{AC} - S L_{AC} \Delta d}{(d + L_{AC})^2}$$

Second, error caused by the resolution of a pixel for a triangle with a deviation angle $\beta$:

$$\Delta h_2 = \frac{1}{2} \text{resolution} * \tan \beta$$

Then $\Delta h = \Delta h_1 + \Delta h_2$

Third, error caused by the camera parameters. The transformation from the image frame to the camera frame can be expressed as:

$$\begin{bmatrix} X_c \\ Y_c \\ Z_c \end{bmatrix} = \begin{bmatrix} \frac{S-h}{F} & 0 & 0 \\ 0 & \frac{S-h}{F} & 0 \\ 0 & 0 & S-h \end{bmatrix} \begin{bmatrix} X_1 \\ Y_1 \\ 1 \end{bmatrix} \quad (17)$$

Since S, F and h have errors, the follow equation is obtained:

$$\begin{bmatrix} X'_c \\ Y'_c \\ Z'_c \end{bmatrix} = \begin{bmatrix} \frac{S-h+\Delta S-\Delta h}{F+\Delta F} & 0 & 0 \\ 0 & \frac{S-h+\Delta S-\Delta h}{F+\Delta F} & 0 \\ 0 & 0 & S-h+\Delta S-\Delta h \end{bmatrix} \begin{bmatrix} X_I \\ Y_I \\ 1 \end{bmatrix} \quad (18)$$

The error can be obtained:

$\Delta X_c = X'_c - X_c$ $\Delta Y_c = Y'_c - Y_c$ $\Delta Z_c = Z'_c - Z_c$  (19)

Fourth, error generated by coordination transformation. Since the coordinates in the camera frame has to be transferred into the robot base frame, the transformation will generate some error. Since the transformation matrix is obtained using a calibration method, the error of the transformation matrix is modeled as:

$$\Delta T = \begin{bmatrix} \Delta r_{11} & \Delta r_{12} & \Delta r_{13} \\ \Delta r_{21} & \Delta r_{22} & \Delta r_{23} \\ \Delta r_{31} & \Delta r_{32} & \Delta r_{3} \end{bmatrix} \quad (20)$$

Thus, the error due to the transformation can be modeled as:

$$\begin{bmatrix} \Delta X_R \\ \Delta Y_R \\ \Delta Z_R \end{bmatrix} = (T+\Delta T)\begin{bmatrix} X'_C \\ Y'_C \\ Z'_C \end{bmatrix} - T\begin{bmatrix} X_C \\ Y_C \\ Z_C \end{bmatrix} \approx T\begin{bmatrix} \Delta X_C \\ \Delta Y_C \\ \Delta Z_C \end{bmatrix} + \Delta T\begin{bmatrix} X_C \\ Y_C \\ Z_C \end{bmatrix} \quad (21)$$

Equation (20) is also the system error. The error can be used to adjust the viewpoints to decrease the error.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automated dimensional inspection system having a sensor for capturing image data, comprising:
   a sensor planner adapted to receive three dimensional design data for a workpiece to be measured and operable to generate path data in part based on the dimensional design data for the workpiece from the sensor, where the path data is indicative of a path for moving the sensor in relation to the surface of the workpiece; and
   an error map generator adapted to receive three dimensional measurement data for the workpiece from the sensor and the dimensional design data for the workpiece, the error model generator operable to determine error data between the measurement data and the dimensional design data;
   the sensor planner further adapted to receive the error data from the error map generator and operable to modify the path data based in part on the error data.

2. The automated dimensional inspection system of claim 1 wherein the sensor is further defined as having a camera operable to capture image data representative of a portion of the surface of the workpiece and a projector operable to project a light pattern onto the surface of the workpiece.

3. The automated dimensional inspection system of claim 1 wherein the sensor is affixed to a movable member of a robot.

4. The automated dimensional inspection system of claim 1 wherein the sensor planner is adapted to receive performance parameters within which to perform an inspection operation and operable to generate the path data in part based on the performance parameters.

5. The automated dimensional inspection system of claim 1 wherein the sensor planner is adapted to receive attribute data for the sensor and operable to generate the path data in part based on the attribute data.

6. The automated dimensional inspection system of claim 1 wherein the sensor planner is adapted to receive task constraint data for an inspection operation and operable to generate the path data in part based on the task constraint data.

7. The automated dimensional inspection system of claim 1 wherein the sensor planner is operable to determine a plurality of viewpoints at which the sensor captures image data for at least a portion of the surface of the workpiece and translate the plurality of viewpoints into path data for the sensor.

8. The automated dimensional inspection system of claim 7 wherein the workpiece is modeled as a plurality of facets and the sensor planner is operable to identify facets indicative of a potential measurement error, where the identified facets are associated with a given viewpoint.

9. The automated dimensional inspection system of claim 8 wherein the sensor planner determines an angle between a vector projecting in a normal direction from a given facet being inspected and a vector representing an orientation of the sensor at the given viewpoint at which image data is captured for said facet.

10. The automated dimensional inspection system of claim 8 wherein sensor projects light onto the surface of the workpiece and evaluates intensity of captured image data to identify shadow areas on the surface of the workpiece.

11. The automated dimensional inspection system of claim 8 wherein the sensor planner compares the error data for a given facet to a predefined maximum error value.

12. The automated dimensional inspection system of claim 8 wherein the sensor planner is operable to evaluate the given viewpoint based on the identified facets and generate additional viewpoints when the given view point is deemed unacceptable.

13. The automated dimensional inspection system of claim 8 wherein the sensor planner further divides each of the identified facets into smaller facets prior to determining the additional view points.

14. The automated dimensional inspection system of claim 8 wherein the sensor planner evaluates the given viewpoint by calculating an average normal for the identified facets, determine an angle between the average normal and a normal for each of the identified facets, identifying a maximum angle from amongst the determined angles and compare the maximum angle to a predefined threshold angle.

15. The automated dimensional inspection system of claim 1 further comprises a height map generator adapted to receive image data representative of a portion of the surface of the workpiece and operable to generator three-dimensional measurement data for the workpiece, wherein the three-dimensional measurement data serves as an input to the error map generator.

16. The automated dimensional inspection system of claim 1 wherein the height map generator is operable to project a pattern of light having repeatable features onto a surface of a workpiece, correlating the repeatable features of the light pattern to a measure at which image data is captured, and determining a height measure for a given measurement point on the surface of the workpiece based in part on location of the measurement point in relation to the repeatable features of the light pattern.

17. An automated dimensional inspection system having a sensor for capturing image data, comprising:
   a sensor planner adapted to receive three dimensional design data for a workpiece to be measured and operable to determine a plurality of viewpoints at which the sensor captures image data for at least a portion of the surface of the workpiece and translate the plurality of viewpoints into path data for the sensor, where the workpiece is modeled as a plurality of facets and the path data is indicative of a path for moving the sensor in relation to the surface of the workpiece; and
   an error map generator adapted to receive three dimensional measurement data for the workpiece and the dimensional design data for the workpiece, the error model generator operable to determine error data between the measurement data and the dimensional design data;
   the sensor planner further adapted to receive the error data from the error map generator and operable to identify facets indicative of a potential measurement error which are associated with a given viewpoint, evaluatethe given view point based on the identified facets and generate additional view points encompassing the identified facts, thereby modifying the path data.

18. An automated dimensional inspection system having a sensor for capturing image data, comprising:
   a sensor planner adapted to receive three dimensional design data for a workpiece to be measured and operable to generate path data in part based on the dimensional design data for the workpiece, where the path data is indicative of a path for moving the sensor in relation to the surface of the workpiece;
   a height map generator adapted to receive image data representative of a portion of the surface of the workpiece and operable to generator three-dimensional measurement data for the workpiece, wherein the three-dimensional measurement data serves as an input to the error map generator; and
   an error map generator adapted to receive the three dimensional measurement data for the workpiece and the dimensional design data for the workpiece, the error model generator operable to determine error data between the measurement data and the dimensional design data;
   the sensor planner further adapted to receive the error data from the error map generator and operable to modify the path data based in part on the error data.

19. The automated dimensional inspection system of claim 18 wherein the height map generator is operable to project a pattern of light having repeatable features onto a surface of a workpiece, correlating the repeatabie features of the light pattern to a measure at which image data is captured, and determining a height measure for a given measurement point on the surface of the workpiece based in part on location of the measurement point in relation to the repeatable features of the light pattern.

20. A method for determining height information of a workpiece using a non-contact sensor, comprising:
   projecting a pattern of light having repeatable features onto a surface of the workpiece;
   increasing frequency of the stripes in the light pattern and decreasing width of each strip in the light pattern until the width of each strip substantially correlates to a width dimension of a pixel in the imaging device;
   correlating the repeatable features of the light pattern to a measure at which image data for the surface of the workpiece is captured; and
   determining a height measure for a given measurement point on the surface of the workpiece based in part on location of the measurement point in relation to the light pattern.

21. The method of claim 20 further comprises using an imaging device having a plurality of pixels to capture image data, such that the repeatable features of the light pattern are correlated to dimensions of the pixels of the imaging device.

22. The method of claim 20 wherein the light pattern is further defined as a plurality of stripes projected by a light projector, such that each strip having a given width.

23. The method of claim 20 wherein the step of correlating the repeatable features further comprises projecting different light patterns on the surface of the workpiece and capturing image data indicative of the surface of the workpiece for each of the different light patterns using an imaging device.

24. The method of claim 20 further comprises projecting a pattern of light having a repeatable feature onto a reference plane oriented perpendicular to the light source projecting the light pattern, and correlating the repeatable features of the light pattern to a measure at which the image data is captured.

25. The method of claim 20 wherein the step of determining a height measure for a given measurement point further comprises determining a distance measure between two points on the reference plane, where a first point corresponds to the given measurement point projected along an image plane of the imaging device onto the reference plane and a second point corresponds to the given measurement point projected along a projection plane of the light pattern onto the reference plane.

26. The method of claim 25 wherein the distance measure is expressed as AC=AB+BC, where A is the first point, C is the second point and B is a point interposed between the first and second points at a location that corresponds to the location of the second point within a given strip, such that a distance measure for BC is determined by counting a number of strips between points B and C.

27. The method of claim 26 wherein a distance measure for AB is determined by counting a number of pixels between points A and B.

28. The method of claim 26 wherein the height measure is computed in accordance with $$h(x, y) = \frac{L_{AC}S}{d + L_{AC}}$$

where, AC is the distance measure between the two points on the reference plane, S is the distance from the imaging device and the reference plane, and d is the distance between the light source and the imaging device.

29. A method for determining height information of a workpiece using a non-contact sensor, comprising:
projecting a pattern of light having a repeatable feature onto a reference plane oriented perpendicular to the light source projecting the light pattern;
correlating the repeatable features of the light pattern to a measure at which the image data is captured; and
determining a height measure for a given measurement point on the surface of the workpiece by determining a distance measure between two points on the reference plane, where a first point corresponds to the given measurement point projected along an image plane of the imaging device onto the reference plane and a second point corresponds to the given measurement point projected along a projection plane of the light pattern onto the reference plane.

30. The method of claim 29 wherein the distance measure is expressed as AC=AB+BC, where A is the first point, C is the second point and B is a point interposed between the first and second points at a location that corresponds to the location of the second point within a given strip, such that a distance measure for BC is determined by counting a number of strips between points B and C.

31. The method of claim 30 wherein a distance measure for AB is determined by counting a number of pixels between points A and B.

32. The method of claim 30 wherein the height measure is computed in accordance with $$h(x, y) = \frac{L_{AC}S}{d + L_{AC}}$$

where, AC is the distance measure between the two points on the reference plane, S is the distance from the imaging device and the reference plane, and d is the distance between the light source and the imaging device.

* * * * *

UNITED STATES PATENT AND TRADEMARK OFFICE
CERTIFICATE OF CORRECTION

PATENT NO. : 7,111,783 B2
APPLICATION NO. : 10/877083
DATED : September 26, 2006
INVENTOR(S) : Ning Xi, Chen Heping and Quan Shi It is certified that error appears in the above-identified patent and that said Letters Patent is hereby corrected as shown below:

Column 2, line 5, after "is" insert --a--.

Column 2, line 18, "measure" should be --measured--.

Column 3, line 10, delete "the" after "for".

Column 3, line 46, "problems" should be --problem--.

Column 4, line 18, "technique" should be --techniques--.

Column 4, line 37, "use" should be --used--.

Column 5, line 51, "expresses" should be --expressed--.

Column 6, line 9, "generate" should be --generated--.

Column 6, line 32, "involve" should be --involved--.

Column 6, line 36, after "can", insert --be--.

Column 7, line 34, "show" should be --shows--.

Column 7, line 55, "[X'$_B$Y'$_B$Z'$_B$]" should be --[X'$_B$Y'$_B$Z'$_B$]'--.

Column 9, line 1, "follow" should be --following--.

Column 11, line 8, Claim 15, "generator" should be --generate--.

Column 11, lines 41-42, Claim 17, "evaluatethe" should be --evaluate the--.

Column 11, line 44, Claim 17, "facts" should be --facets--.

Column 11, line 55, Claim 18, "generator" should be --generate--.

Column 12, line 16, Claim 20, "strip" should be --stripe--.

Column 12, line 17, Claim 20, "strip" should be --stripe--.

Column 12, line 33, Claim 22, "strip" should be --stripe--.

Column 12, line 59, Claim 26, "strip" should be --stripe--.

Column 12, line 61, Claim 26, "strip" should be --stripe--.

UNITED STATES PATENT AND TRADEMARK OFFICE
CERTIFICATE OF CORRECTION

PATENT NO. : 7,111,783 B2
APPLICATION NO. : 10/877083
DATED : September 26, 2006
INVENTOR(S) : Ning Xi, Chen Heping and Quan Shi It is certified that error appears in the above-identified patent and that said Letters Patent is hereby corrected as shown below:

Column 14, line 5, Claim 30, "strip" should be --stripe--.

Column 14, line 7, Claim 30, "strip" should be --stripe--.

Signed and Sealed this

Fifth Day of May, 2009

JOHN DOLL
*Acting Director of the United States Patent and Trademark Office*